United States Patent
Yokomizo

(10) Patent No.: US 10,735,612 B2
(45) Date of Patent: Aug. 4, 2020

(54) IMAGE FORMING APPARATUS, CONTROL METHOD THEREFOR, AND PROGRAM

(71) Applicant: CANON KABUSHIKI KAISHA, Tokyo (JP)

(72) Inventor: So Yokomizo, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/799,471

(22) Filed: Oct. 31, 2017

(65) Prior Publication Data

US 2018/0054537 A1    Feb. 22, 2018

Related U.S. Application Data

(63) Continuation of application No. 15/216,591, filed on Jul. 21, 2016, now Pat. No. 9,832,333, which is a continuation of application No. 14/055,245, filed on Oct. 16, 2013, now Pat. No. 9,432,544.

(30) Foreign Application Priority Data

Oct. 29, 2012 (JP) .................................. 2012-237452

(51) Int. Cl.
| | |
|---|---|
| *H04N 1/00* | (2006.01) |
| *G06K 15/00* | (2006.01) |
| *H04N 1/44* | (2006.01) |
| *G06F 3/12* | (2006.01) |
| *G06F 21/60* | (2013.01) |

(52) U.S. Cl.
CPC ......... *H04N 1/00896* (2013.01); *G06K 15/00* (2013.01); *H04N 1/00904* (2013.01); *H04N 1/4413* (2013.01); *H04N 1/4433* (2013.01); *G06F 3/1297* (2013.01); *G06F 21/608* (2013.01); *H04N 2201/0094* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,542,372 | B2 * | 9/2013 | Nishio | H04N 1/00411 358/1.13 |
| 2006/0007469 | A1 * | 1/2006 | Uruma | H04N 1/0035 358/1.14 |
| 2012/0167201 | A1 * | 6/2012 | Maeda | H04N 1/00474 726/17 |

FOREIGN PATENT DOCUMENTS

| | | |
|---|---|---|
| JP | 2002-314727 A | 10/2002 |
| JP | 2008-160413 A | 7/2008 |
| JP | 2010-166482 A | 7/2010 |
| JP | 2012-191369 A | 10/2012 |

(Continued)

*Primary Examiner* — Vu B Hang
(74) *Attorney, Agent, or Firm* — Canon U.S.A., Inc. IP Division

(57) ABSTRACT

An image forming apparatus includes a plurality of devices configured to perform different job processing, a control unit configured to control job processing performed by each device, a reception unit configured to receive an instruction for causing the control unit to shift to a state where the job processing is capable of being performed, and a power control unit configured to, when the control unit is shifted to a stand-by state in response to receiving the instruction, supply a power to a device specified based on a job processing function corresponding to an initial screen to be displayed.

20 Claims, 12 Drawing Sheets

(56) References Cited

FOREIGN PATENT DOCUMENTS

JP 2013-232087 A 11/2013

* cited by examiner

FIG.2C

| SCAN AND STORAGE |
|---|
| SPECIFY STORAGE LOCATION. |

BOX

| BOX NUMBER |
|---|
| 00 |
| 01 |
| 02 |
| 03 |

UPWARD

FIG.2D

| USE OF STORED FILE |
|---|
| SELECT LOCATION OF FILE TO BE USED. |

BOX

| BOX NUMBER |
|---|
| 00 |
| 01 |
| 02 |
| 03 |

UPWARD

FIG.3

TABLE OF RELATIONSHIP BETWEEN
FUNCTIONS AND DEVICES TO BE ENERGIZED

| SYSTEM FUNCTION \ DEVICE | SCANNER DEVICE | PRINTER DEVICE | CONTROLLER | IMAGE PROCESSING UNIT |
|---|---|---|---|---|
| COPY | ○ | ○ | ○ | ○ |
| SCAN AND STORAGE | ○ | × | ○ | ○ |
| USE OF STORED FILE | × | ○ | ○ | ○ |
| FAX TRANSMISSION | ○ | × | ○ | ○ |
| OTHERS | × | × | ○ | × |

IMAGE FORMING APPARATUS, CONTROL METHOD THEREFOR, AND PROGRAM

CROSS REFERENCE

The current application is a continuation of U.S. patent application Ser. No. 15/216,591 filed Jul. 21, 2016 which claims the benefit of U.S. patent application Ser. No. 14/055,245 filed Oct. 16, 2013, now issued as U.S. Pat. No. 9,432,544, which claims the benefit of Japanese Patent Application No. 2012-237452 filed Oct. 29, 2012, both of which are hereby incorporated by reference herein in its entirety.

BACKGROUND OF THE INVENTION

Field of the Invention

The present invention relates to an image forming apparatus, a control method therefor, and a program.

Description of the Related Art

Nowadays, business machines (image forming apparatuses) having high power-saving efficiency are demanded in offices. Therefore, in addition to an on/off operation of the image forming apparatus and a power-saving mode over the entire image forming apparatus, a multifunction peripheral (MFP) has been conceived that can reduce an effective power by turning off a power source of a part that is not used even in a stand-by state.

For example, Japanese Patent Application Laid-Open No. 2001-201986 discusses power saving by turning off the power source of a fixing unit or a sheet-feeding system during facsimile receiving operation. While a printer is in printing operation, each unit of the apparatus is controlled to save the power according to a selected application function. For example, the power is saved by turning off the power source of an operation panel and an image scanner unit.

It can be conceived that, to obtain high power-saving efficiency in the image forming apparatus, the power source of devices such as a printer and a scanner are turned on when the devices are used, and turned off right after the devices are finished to be used.

However, since some devices take long time to perform initialization processing after the power source is turned on, each time a user uses an arbitrary function, a waiting time is generated. In other words, for such a user who often uses the device taking long time to perform initialization, user responsiveness of the image forming apparatus when the apparatus is started to be used is drastically decreased.

Such a situation is also a problem, which similarly occurs by factors such as screen setting to be performed on the image forming apparatus by the user, an authority for selecting the function set by the user, and history of functions used in the image forming apparatus by the authenticated user. In other words, in the situation as described above, only after a controller of the image forming apparatus is recovered, the power is started to be supplied to the device requested by the user, and thus the waiting time of the user is generated. Further, if all the functions are set to be ready to be performed independently from the user's request, the power needs to be supplied to the all of the devices. Thus, the power is wastefully consumed for an unnecessary function.

SUMMARY OF THE INVENTION

The present invention is directed to a mechanism for starting power supply to a device specified based on a job processing function to be performed by a user in parallel with a controller shifting to a stand-by state.

According to an aspect of the present invention, an image forming apparatus includes a plurality of devices configured to perform different job processing, a control unit configured to control job processing performed by each device, a reception unit configured to receive an instruction for causing the control unit to shift to a state where the job processing is capable of being performed, and a power control unit configured to, when the control unit is shifted to a stand-by state in response to receiving the instruction, supply a power to a device specified based on a job processing function corresponding to an initial screen to be displayed.

Further features of the present invention will become apparent from the following description of exemplary embodiments with reference to the attached drawings.

BRIEF DESCRIPTION OF THE DRAWINGS

FIG. 2C illustrates an example of the UI screen displayed on the operation unit illustrated in FIG. 1.

FIG. 2D illustrates an example of the UI screen displayed on the operation unit illustrated in FIG. 1.

FIG. 3 illustrates relationships between job processing and devices to be energized in the image forming apparatus.

DESCRIPTION OF THE EMBODIMENTS

Various exemplary embodiments, features, and aspects of the invention will be described in detail below with reference to the drawings.

<Description of System Configuration>

Figure 1:
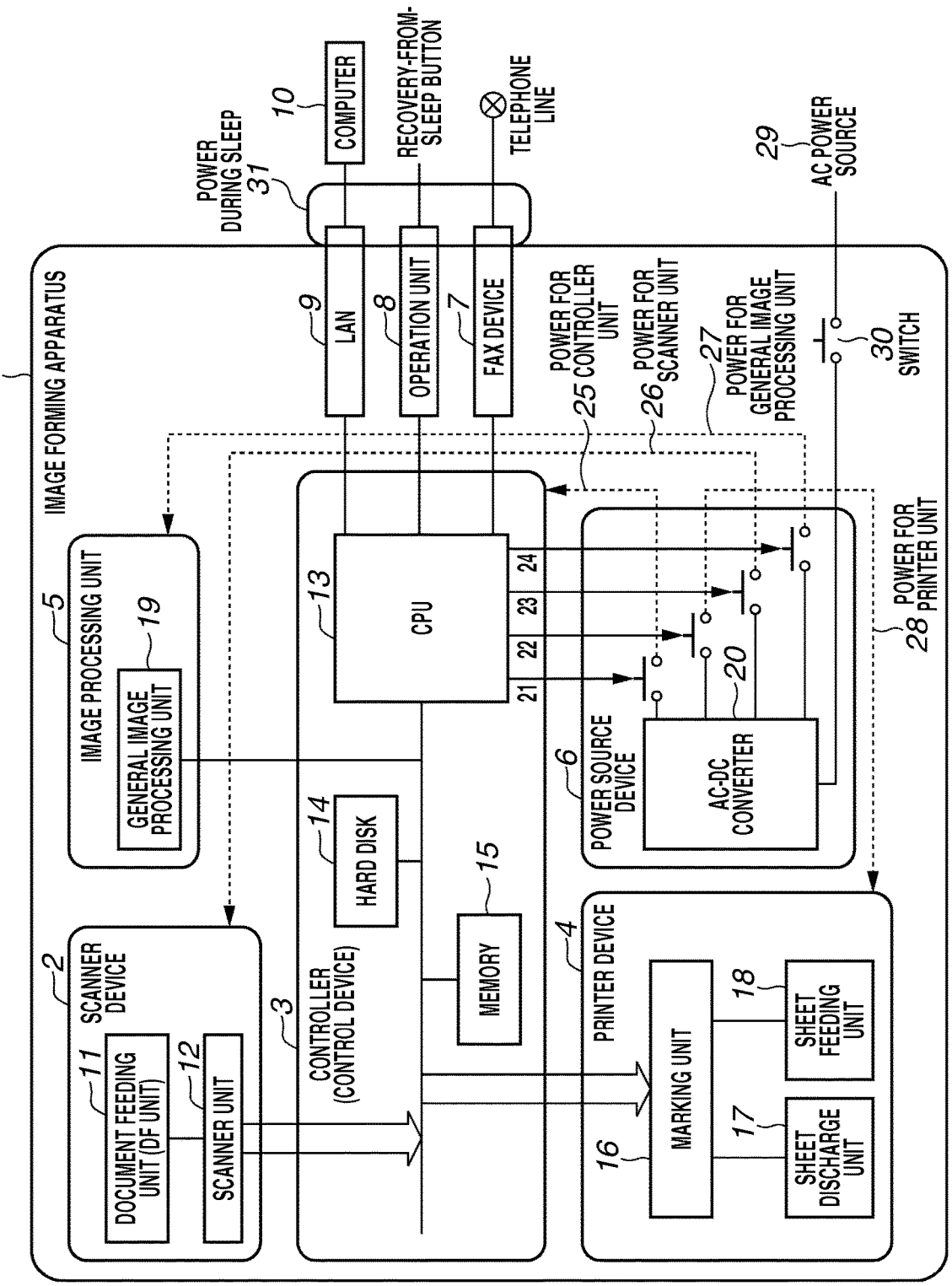
FIG. 1 is a block diagram illustrating a configuration of an image forming apparatus.

A first exemplary embodiment will be described below. FIG. 1 is a block diagram illustrating a configuration of an image forming apparatus according to a present exemplary embodiment. According to the present exemplary embodiment, an example will be described in which a printer device 4 performing a print processing function, a scanner device 2 performing a scanning processing function, and an image processing unit 5 performing an image processing function for the printer device 4 and the scanner device 2 are included as a device performing job processing. However, the present exemplary embodiment is not limited thereto. The image forming apparatus described in the present exemplary embodiment includes a control device (controller) 3 for controlling the job processing performed by a plurality of devices performing different processing described above.

As illustrated in FIG. 1, the scanner device 2 optically reads an image from a document and converts it into a digital image. The printer device 4 outputs the digital image to a sheet device. An operation unit 8 includes a display unit and an instruction unit, and receives an operation instruction from the user to the image forming apparatus. A fax device 7 transmits the digital image to a phone line.

A hard disk 14 stores the digital image and a control program. The controller (control device) 3 controls each device connected to a bus to perform the job processing. The image forming apparatus 1 can input/output the digital image to/from a computer 10 via a local area network (LAN) 9 and issue a job and an instruction for the device.

The scanner device 2 includes a document sheet feeding unit 11 capable of automatically and sequentially replacing a bundle of documents, and a scanner unit 12 capable of optically scanning the document and converting the document into a digital image. Then the converted image data is transmitted to the controller 3.

The printer device 4 includes a sheet feeding unit 18 capable of sequentially feeding each sheet from a bundle of sheets, a marking unit 16 for printing the image data on the fed sheet, and a sheet discharge unit 17 for discharging the sheet on which printing has been performed.

The controller 3 includes a central processing unit (CPU) 13, which transmits/receives the image data to/from the scanner device 2 and the printer device 4, and stores the image data. More precisely, the controller 3 temporarily stores the image data received from the scanner device 2 into a memory 15. Subsequently, the image data is stored in the hard disk 14 and then scanning and storing the image is completed.

The controller 3 temporarily stores the image data in the memory 15 from the hard disk 14, and transmits the image data to the printer device 4 from the memory 15 to perform print output. Further, the image processing unit 5 includes a general image processing unit 19, which performs processing, such as reduction, on the image having been stored in the memory 15, and stores the reduced image again in the memory 15. The general image processing unit 19 is used in various scenes as necessary.

The image forming apparatus 1 includes the operation unit 8 controlled by the controller 3. The CPU 13 can interpret an instruction via an operator operation or the LAN 9, and execute various types of job processing described as below.

Examples will be described below.

[Copy Job Processing]

The image read by the scanner device 2 is stored in the hard disk 14 and, at a time, the printer device 4 is used to perform printing.

[Image Transmission Job Processing]

The image read by the scanner device 2 is stored in the hard disk 14, and then transmitted to the computer 10 via the LAN 9.

[Image Storage Job Processing]

The image read by the scanner device 2 is stored in the hard disk 14, and then transmitted or printed as necessary.

[Image Print Job Processing]

A page description language, for example, transmitted from the computer 10 is analyzed, and then printed by the printer device 4.

[Facsimile Reception Job Processing]

The facsimile image received by the fax device 7 is stored in the hard disk 14 and, at a time, printed by the printer device 4.

[Facsimile Transfer Job Processing]

The facsimile image received by the fax device 7 is stored in the hard disk 14 and, at a time, transferred to the computer 10 via the LAN 9.

[Facsimile Memory Reception Job Processing]

The facsimile image received by the fax device 7 is stored in the hard disk 14 and, then, waits to be referred by an operator.

[Facsimile Transmission Job Processing]

The image read by the scanner device 2 is stored in the hard disk 14 and, at a time, transmitted from the fax device 7 to a public line.

In many cases, the hard disk 14 is interposed in case of a job failure and in order to recover from an abnormal state such as power-off.

A power source device 6 supplies the power to the image forming apparatus 1. When the image forming apparatus 1 is set to be off, an alternating current (AC) power source 29 in the power source device 6 is insulated by a switch 30. In the power source device 6, the switch 30 is turned on to supply the AC power to an AC-direct current (DC) converter 20 to generate the DC power.

The power source device 6 can independently control the entire apparatus with four power sources according to an instruction from the CPU 13.

More precisely, by switch control from the CPU 13, the power source of power for the controller unit 25 can be controlled to be turned on/off. Similarly, the power sources of power for the printer unit 28, power for the scanner unit 26, and power for the general image processing unit 27 can be controlled to be turned on/off.

By the switches 21, 22, 23, and 24, the CPU 13 can appropriately supply the power to a part requiring the power in the image forming apparatus 1. Each power state will be described below.

[Sleep State]

This mode refers to a state where the power of the image forming apparatus 1 itself is reduced to minimum.

Peripheral devices of the CPU 13 are set into a general suspended state (ACPI-S3) and only a part (power during a sleep state 31) where a job can be detected is energized to shift the apparatus to the power state where all of the devices require a very small amount of power.

More specifically, the CPU 13 stores the state of the devices in the memory 15, and the power source of the power for the controller unit 25 including the CPU 13 itself is turned off. At this point, the CPU 13 itself does not operate, however, on hardware, the power during sleep 31 is turned on to be notified that the job has been input. Further, for example, when a network reception via the LAN 9, a facsimile call from the fax device 7, and an operation of the operation unit 8 are performed, the power for the controller unit 25 as the hardware is turned on.

The CPU 13 reads from the memory 15 the state of the apparatus stored in the memory 15 to perform re-setting. The CPU 13 recovers to the state right before the power source of the power for the controller unit 25 is turned off, and then shifts to the stand-by state.

In the sleep state, much of hardware cannot operate and, thus, the image forming apparatus 1 only have a function of shifting to the stand-by state.

The job is received after the image forming apparatus 1 shifts to the stand-by state.

[Stand-by State]

The stand-by state refers to a state where the power for the controller unit 25 is energized. The operation by the operator on the operation unit 8 and the job from the LAN 9 via the network are received.

Since the power for the printer unit 28, the power for the scanner unit 26, and the power for the general image processing unit 27 are set to be off, the CPU 13 executes a predetermined job after the power sources of the devices to be used are energized by the switches 22, 23, and 24. For example, the power source of each device is turned on according to a type of job.

[Power Source State During Copy Job Processing]

The power for the scanner unit 26 and the power for the printer unit 28 are turned on to realize a copy function as described above.

[Power Source State During Image Transmission Job Processing]

Only the power for the scanner unit 26 is turned on to transmit the read image data.

[Power Source State During Image Storage Job Processing]

Only the power for the scanner unit 26 is turned on to store the read image data.

[Power Source State During Image Print Job Processing]

Only the power for the printer unit 28 is turned on to print various types of image data.

[Power Source State During Facsimile Reception Print]

The power for the printer unit 28 and the power for the general image processing unit 27 are turned on to perform general image processing on the received facsimile image and, subsequently, print the facsimile image.

[Power Source State During Facsimile Transfer Processing]

Only the power for the general image processing unit 27 is turned on to perform the general image processing on the facsimile-received data and, subsequently, transfer it.

[Power Source State During Facsimile Memory Reception Processing]

Only the power for the general image processing unit 27 is turned on to perform the general image processing on the facsimile-received data and, subsequently, store it in the hard disk 14.

[Power Source State During Facsimile Transmission Processing]

The power for the scanner unit 26 and the power for the general image processing unit 27 are turned on to transmit the read facsimile image data to the public line.

The power source of the device is turned off when the job has been completed to energize only the required device only when it is used, which enables cutting of a standby power during the stand-by state.

Figure 2A:
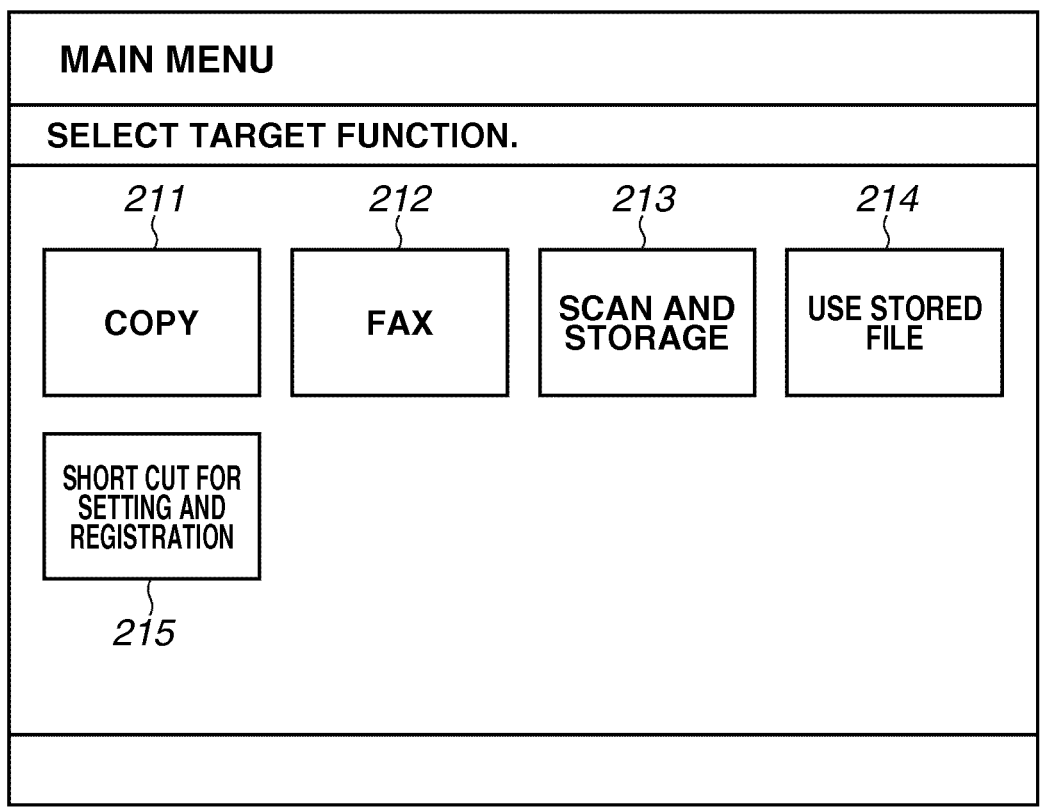
FIG. 2A illustrates an example of a user interface (UI) screen displayed on an operation unit illustrated in FIG. 1.

FIG. 2A illustrates an example of a user interface (UI) screen displayed on the operation unit 8 illustrated in FIG. 1.

The UI screen herein is a main menu screen and first displayed after activation by turning on the power source by factory shipment setting and also after the apparatus recovers from the sleep state.

The UI screen illustrated in FIG. 2A corresponds to a screen first displayed on the display unit of the operation unit 8, and can be changed on a setting/registration screen illustrated in FIG. 2F described below. The main menu screen is provided with a function button. When copy is performed, a button 211 is selected. When facsimile is performed, a button 212 is selected. When scan and storage is performed, a button 213 is selected. When a stored file is used, a button 214 is selected. When setting and registration is performed, a button 215 is selected.

Figure 2B:
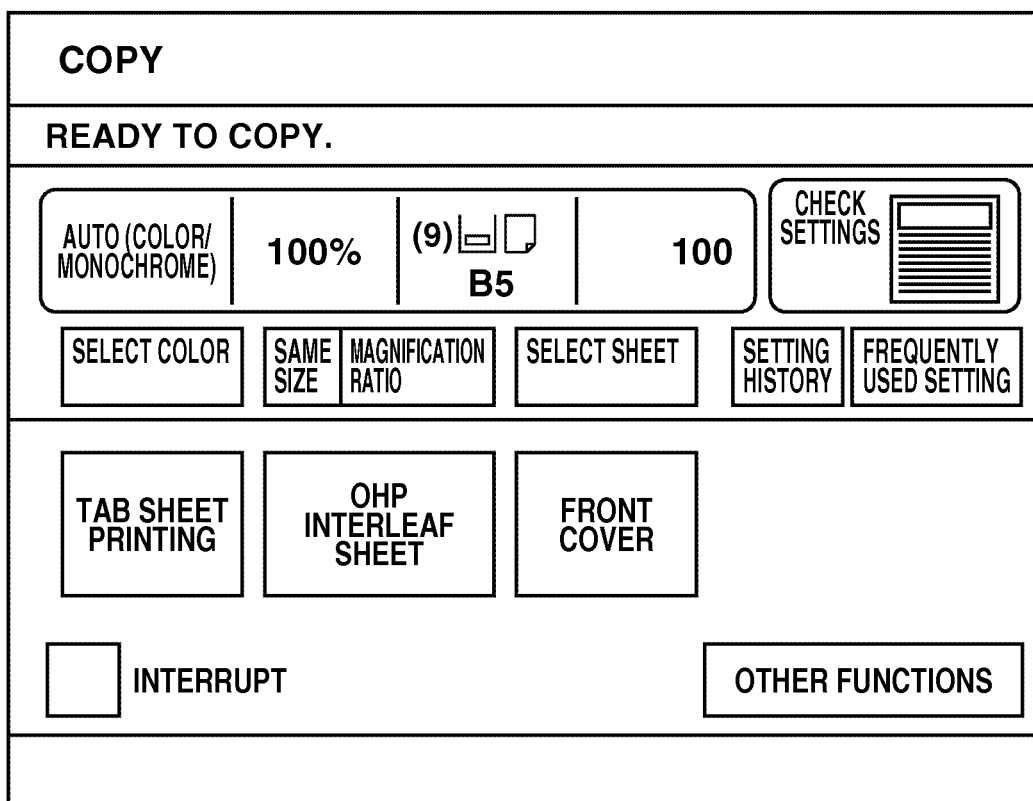
FIG. 2B illustrates an example of the UI screen displayed on the operation unit illustrated in FIG. 1.

FIG. 2B illustrates an example of the UI screen displayed on the operation unit 8 illustrated in FIG. 1. The UI screen herein is a copy screen. When the user selects the button 211, the controller 3 displays the UI screen on the operation unit 8. The user performs various types of settings on the UI screen, and then performs copy.

FIG. 2C illustrates an example of the UI screen displayed on the operation unit 8 illustrated in FIG. 1. The UI screen herein is a screen for a scan and storage function. When the user selects the button 213, the controller 3 displays the UI screen on the operation unit 8. The user determines a storage location of a document to be scanned on the UI screen, and then scans the document.

FIG. 2D illustrates an example of the UI screen displayed on the operation unit 8 illustrated in FIG. 1. The UI screen herein is a screen for a function of using a stored file. When the user selects the button 214, the controller 3 displays the UI screen on the operation unit 8. The user selects the stored file to be output, and then outputs the document.

Figure 2E:
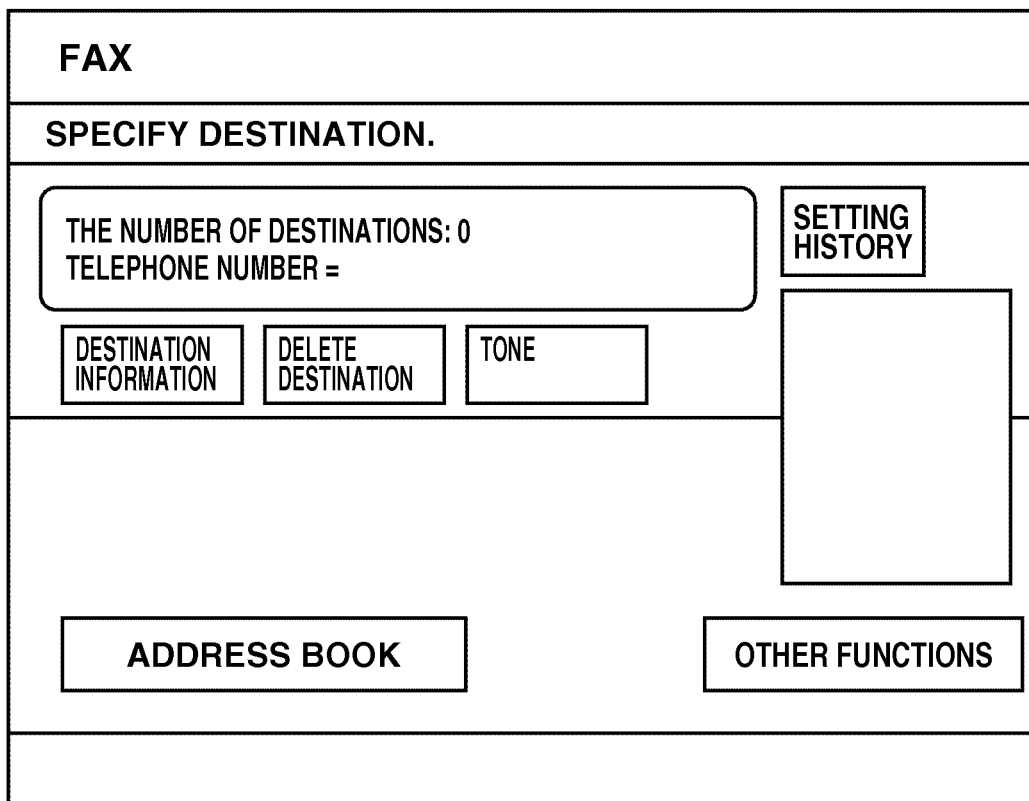
FIG. 2E illustrates an example of the UI screen displayed on the operation unit illustrated in FIG. 1.

FIG. 2E illustrates an example of the UI screen displayed on the operation unit 8 illustrated in FIG. 1. The UI screen herein is a facsimile screen. When the user selects the button 212, the controller 3 displays the UI screen on the operation unit 8. The user sets a transmission destination and transmission settings, and then transmits the facsimile.

Figure 2F:
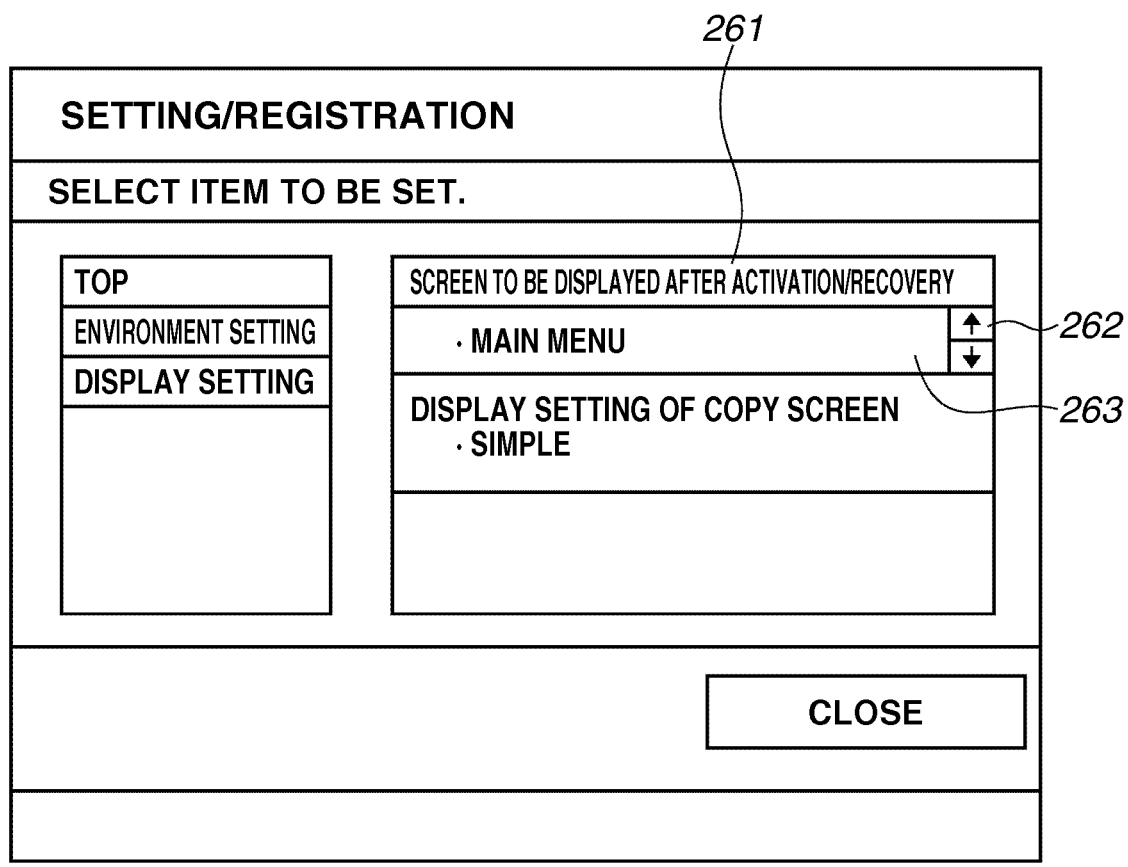
FIG. 2F illustrates an example of the UI screen displayed on the operation unit illustrated in FIG. 1.

FIG. 2F illustrates an example of the UI screen displayed on the operation unit 8 illustrated in FIG. 1. The UI screen herein is an example of the setting/registration screen. When the user presses the setting/registration button 215 on the operation unit 8, the controller 3 displays the UI screen on the operation unit 8. The user can selects the screen to be displayed after activation/recovery 261 is performed, in a setting field. In FIG. 2F, the main menu is set as the screen. When the user selects the copy screen, the screen to be first displayed after activation by turning on the power source or after the apparatus recovers from the sleep state is the copy screen illustrated in FIG. 2B. The setting box 261 includes, for example, a combo box 263, and the screen to be first displayed after activation by turning on the power source or after the apparatus recovers from the sleep state can be selected by a button 262 from among the screens illustrated in FIGS. 2A, 2B, 2C, 2D, and 2E, and registered. The sleep recovery button issues an instruction of request for shifting to a state where the job processing can be performed. By receiving pressing of the sleep recovery button, control for releasing the power-saving mode to shift to the normal mode is started.

FIG. 3 illustrates relationships between job processing and devices to be energized in the image forming apparatus according to the present exemplary embodiment.

In FIG. 3, the devices to be energization-controlled by the system are indicated in lines, and the functions of the system are indicated in rows. When the user selects the copy function to cause the apparatus to perform the job, operations of all of the devices including the scanner device 2, the printer device 4, the controller 3, and the image processing unit 5 are required. Therefore, when the screen illustrated in FIG. 2B is registered as the recovery screen on the screen illustrated in FIG. 2F, the CPU 13 instructs the switches 21, 22, 23, and 24 included in the power source device 6 to turn on/off to start power source supply to the devices used by the copy function in step S404 illustrated in FIG. 4. With such arrangement, after the controller 3 shifts to the stand-by state, a time from when the copy job has been input to when the job processing is started can be reduced.

Similarly, when the scan and storage function is performed, the operations of the scanner device 2, the controller 3, and the image processing unit 5 are required. Therefore, when the screen illustrated in FIG. 2C is registered as the recovery screen on the screen illustrated in FIG. 2F, the CPU 13 instructs the switches 21, 22, 23, and 24 included in the power source device 6 to turn on/off to start the power source supply to the devices used by the scan function in step S404 illustrated in FIG. 4. With such arrangement, after the controller 3 shifts to the stand-by state, a time from when the scan job has been input to when the job processing is started can be reduced. Further, since the power supply to the printer device 4 is limited, the scan job can be performed with a power-saving effect maintained.

Similarly, when the function of using the stored file is performed, the operations of the printer device 4, the controller 3, and the image processing unit 5 are required. Therefore, when the screen illustrated in FIG. 2D is registered as the recovery screen on the screen illustrated in FIG. 2F, the CPU 13 instructs the switches 21, 22, 23, and 24 included in the power source device 6 to turn on/off to start the power source supply to the devices used by the storage job function in step S404 illustrated in FIG. 4. With such arrangement, after the controller 3 shifts to the stand-by state, a time from when the storage job has been input to when the job processing is started can be reduced.

Similarly, when the facsimile function is performed, the operations of the scanner device 2, the controller 3, and the image processing unit 5 are required. In other cases, the operation of the controller 3 is required. Therefore, when the screen illustrated in FIG. 2E is registered as the recovery screen on the screen illustrated in FIG. 2F, the CPU 13 instructs the switches 21, 22, 23, and 24 included in the power source device 6 to turn on/off to start the power source supply to the devices used by the facsimile function in step S404 illustrated in FIG. 4. With such arrangement, after the controller 3 shifts to the stand-by state, a time from when the storage job has been input to when the job processing is started can be reduced. Since the power supply to the printer device 4 is limited, the facsimile job can be performed with the power-saving effect maintained.

Even before the job type is determined, when the copy screen is selected, for example, it is considered that the copy function is highly likely to be performed. Thus, according to the present exemplary embodiment, when the screen for the copy function is set as the initial screen when activation or the sleep recovery is performed, the power source of the device to be used is controlled as illustrated in FIG. 4 when activation or the sleep recovery is performed.

Figure 4:
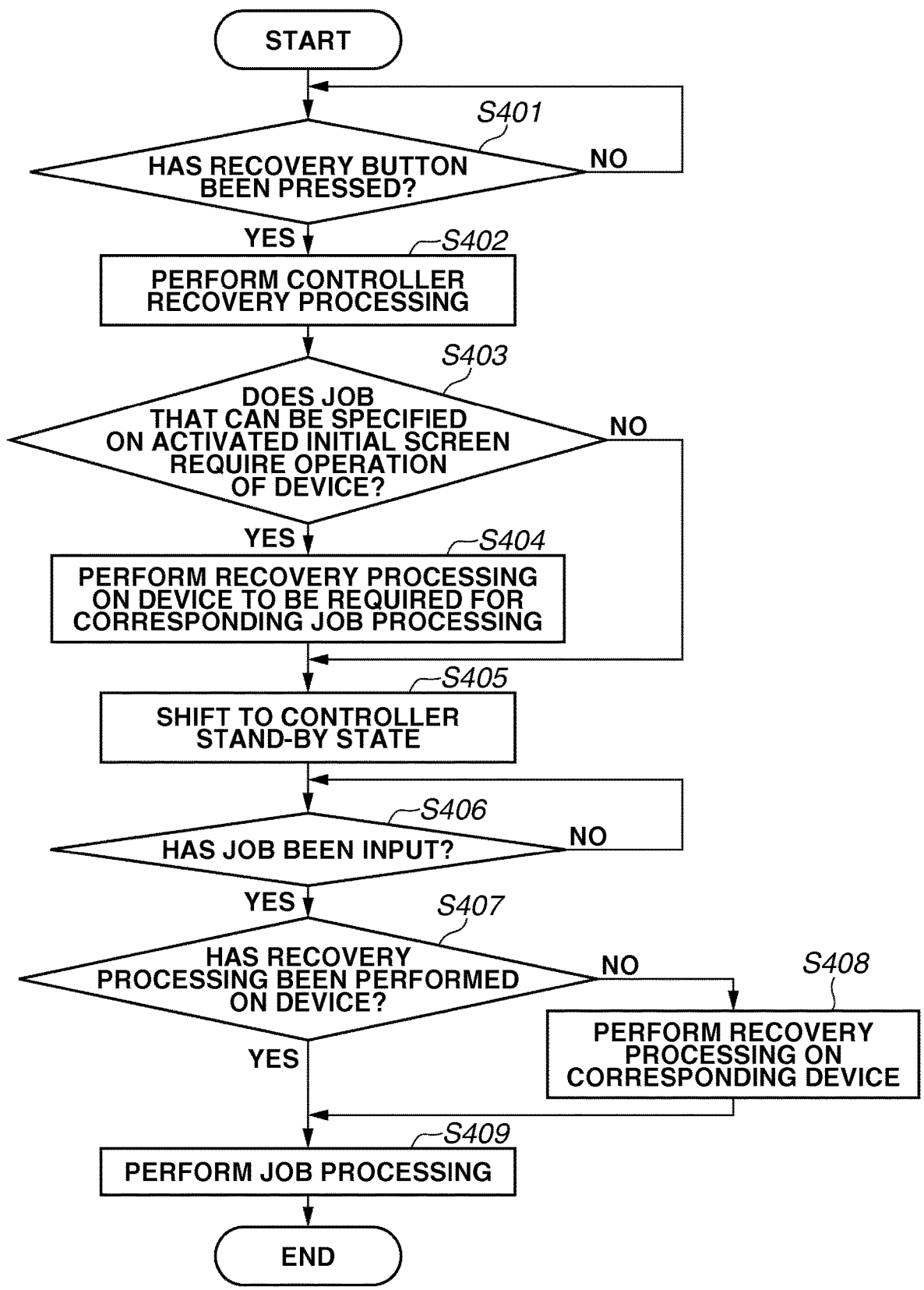
FIG. 4 is a flowchart illustrating a control method for the image forming apparatus.

FIG. 4 is a flowchart illustrating a control method for the image forming apparatus according to the present exemplary embodiment. This example shows control of recovery timing of the device to be used by the job processing corresponding to the initial screen. This flow illustrates an example of controlling start of the power supply to the device to be used by the job function corresponding to the recovery screen that is set and registered by the user in parallel with the processing in which the controller 3 stands by when the apparatus is shifted to the stand-by state from the sleep state, and then the job is performed. Each step can be realized by the CPU 13 executing the control program stored in the hard disk 14 or a read-only memory (ROM). An example of the power control will be described below in which, when the controller 3 shifts to the stand-by state according to the received instruction, the power is supplied to the device specified based on the job processing function corresponding to the initial screen to be displayed. According to the present exemplary embodiment, the instruction for shifting to the state where the job processing can be performed indicates a power-on instruction or the instruction (sleep recovery instruction) for recovering to a normal state from the power-saving state.

If the user presses the sleep recovery button on the operation unit 8 during the sleep state (YES in step S401), in step S402, the CPU 13 of the controller 3 performs the sleep recovery processing as described above. The controller 3 determines at the end of the recovery processing which job processing of function the screen indicates which is to be displayed on the operation unit 8 and registered by the user on the UI screen illustrated in FIG. 2F indicates. Further, in step S403, the controller 3 determines which operation of the device is required by the job that can be input on the initial screen to be displayed when the power source is recovered according to the relationships between the job processing and the power supply destination as illustrated in FIG. 3 to perform the job processing function specified on the UI screen to be displayed at the time of recovery.

To perform the job processing corresponding to the UI screen to be displayed at the time of recovery, when the CPU 13 determines that the operation of the device requiring the recovery operation is required (YES in step S403), then in step S404, the CPU 13 turns on the power source of the device to perform the recovery processing. With such arrangement, the job processing of the UI screen to be displayed as the initial screen on the operation unit 8 at the time of recovery is set to be performed.

In step S405, the CPU 13 shifts to the stand-by state. When the user gives an instruction for performing the job using the UI screen displayed as the initial screen on the operation unit 8 (YES in step S406), then, in step S407, the CPU 13 determines whether the recovery processing state of the device required for the job to be performed has been completed.

When the CPU 13 determines that the recovery processing state of the device required by the job to be performed has been completed (YES in step S407), then in step S409, the job processing is performed immediately, and the processing ends.

On the other hand, when the CPU 13 determines that the recovery processing state of the device required by the job to be performed has not been completed (NO in step S407), then in step S408, the device to be used in the job processing corresponding to the UI screen to be displayed as the initial screen is shifted to the state where the job processing can be performed, and the processing proceeds to step S409.

With such arrangement, after the user gives the instruction for performing the job, since engine recovery processing is not usually performed in step S408, the job processing corresponding to the initial screen by the user can be swiftly performed without deteriorating the responsiveness of the image forming apparatus.

A second exemplary embodiment will be described below.

An exemplary embodiment of the image forming apparatus illustrated in FIGS. 1, 2, and 3 will be described below in which the power source supply destination of the image forming apparatus is controlled when the sleep state is shifted to the stand-by state and the user uses the function requiring authentication.

Figure 5:
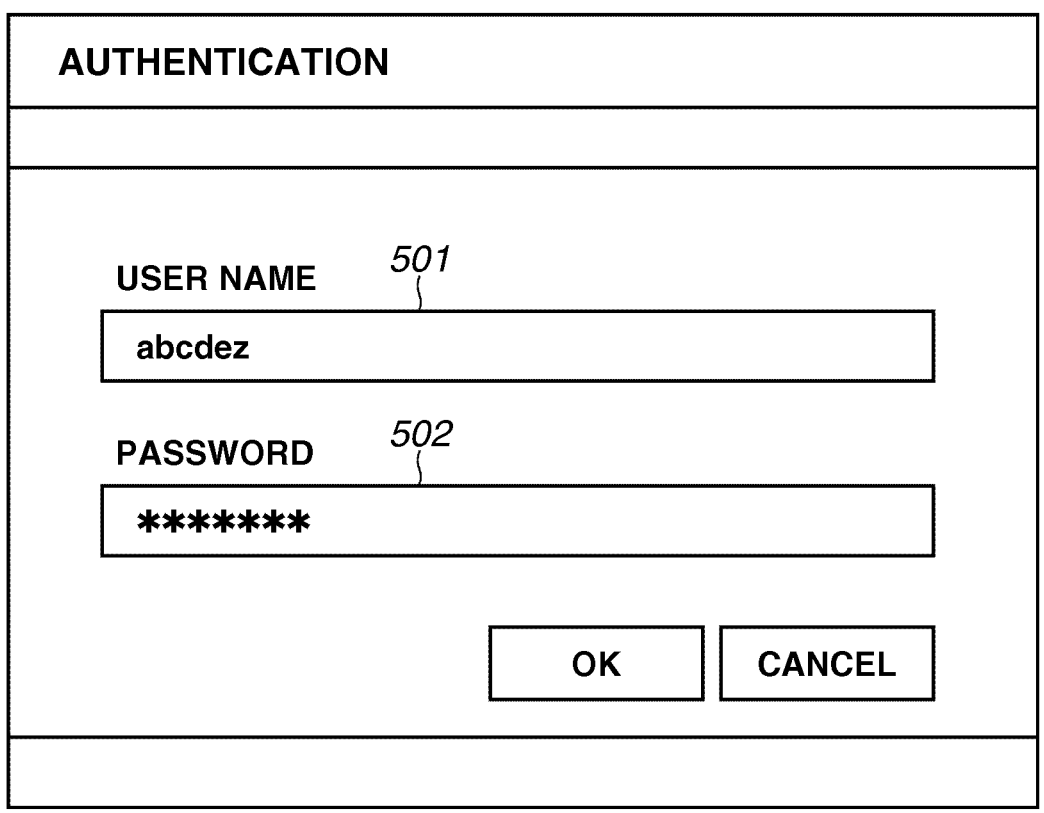
FIG. 5 illustrates an example of the UI screen displayed on the operation unit illustrated in FIG. 1.

FIG. 5 illustrates an example of the UI screen displayed on the operation unit 8 illustrated in FIG. 1. The example shows a user authentication screen of each function. The user authentication screen is required when usage of each function is limited, for example, when the copy function is permitted only for an authenticated and specified user. Algorithm of the authentication is arbitrary, and the authentication is performed with a user name 501 and a password 502 as illustrated in FIG. 5. However, other authentication methods using an integrated circuit (IC) card and a fingerprint may be adopted. According to the present exemplary embodiment, when the user selects the job processing function to be displayed on the initial screen using the UI screen illustrated in FIG. 5, the function setting screen based on the selected job processing function is stored in the hard disk 14 as the initial screen. The configuration is adopted in which the CPU 13 specifies the initial screen to be displayed corresponding to the stored job processing function. The method for specifying the initial screen is similar to that of the first exemplary embodiment.

Figure 6:
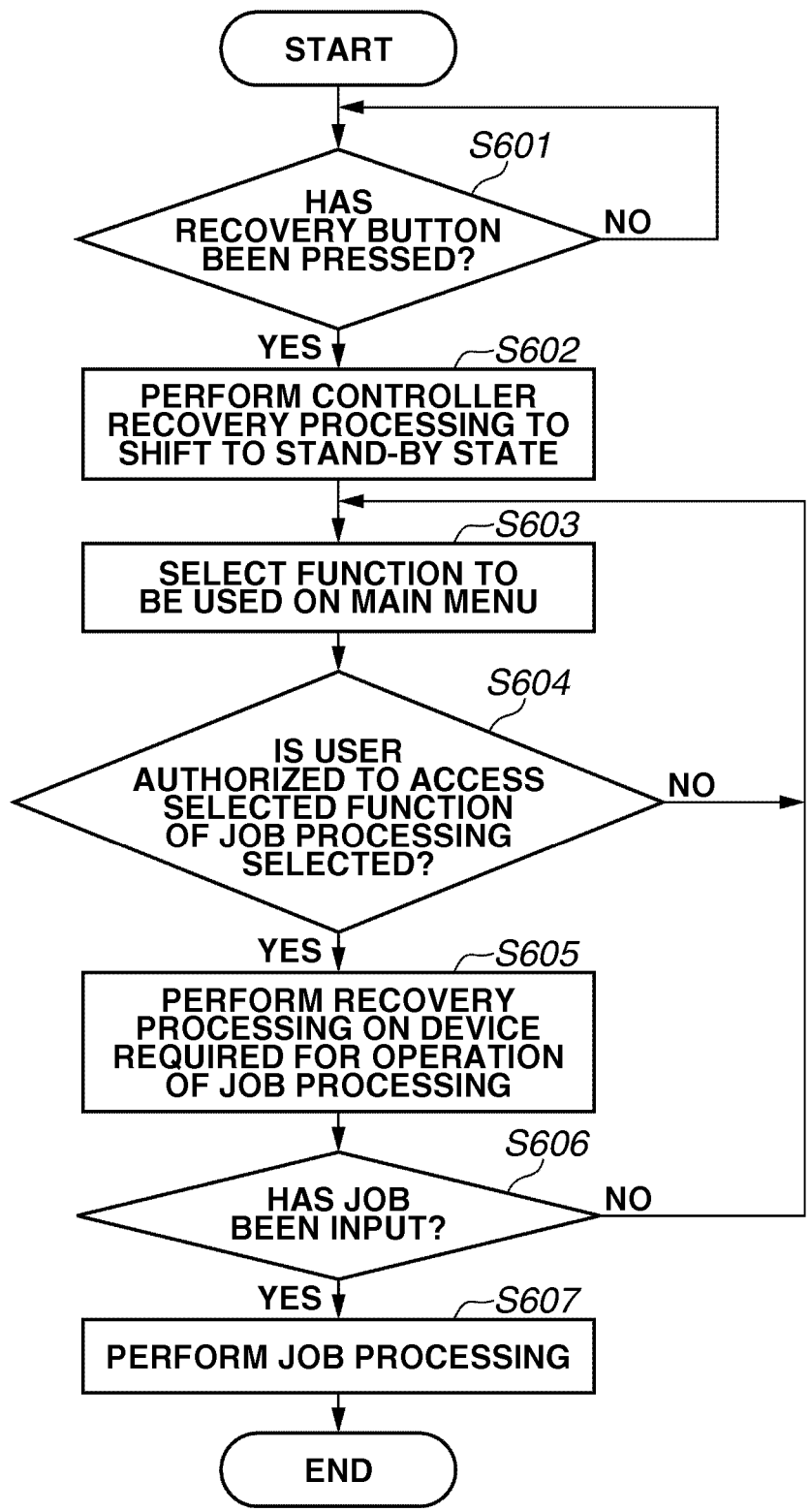
FIG. 6 is a flowchart illustrating a control method for the image forming apparatus.

FIG. 6 is a flowchart illustrating a control method for the image forming apparatus according to the present exemplary embodiment. The example illustrates control in which the power supply to the device to be used in the job is started to cause the device to recover the state where the job processing can be performed at the timing when the job, which the user is determined to be capable of using in the user authentication processing, is fixedly determined. Each step can be realized by the CPU 13 executing the control program stored in the hard disk 14 or the ROM. Subsequently, an example of the power control will be described in which, when the controller 3 shifts to the stand-by state, if it is determined that the job processing function selected by the user using the initial screen to be displayed can be performed, the power is supplied to the device specified by the selected job processing function.

When the user presses a sleep recovery button on the operation unit 8 (YES in step S601), in step S602, the CPU 13 of the controller 3 performs predetermined sleep recovery processing as described above and then, shifts to the stand-by state.

In step S603, since the main menu screen corresponding to the UI screen illustrated in FIG. 2A is displayed on the operation unit 8 when the recovery processing is performed, the user selects the function to be used on the main menu screen. At this point, the CPU 13 confirms the operation instruction from the user to the operation unit 8 to specify the selected function. Subsequently, in step S604, the CPU 13 determines whether the user is authorized to use the selected function while the authentication screen illustrated in FIG. 5 is displayed on the operation unit 8 as the UI screen. It is assumed that, in the image forming apparatus, the function that can be used by the user is previously registered by an administrator. Therefore, the CPU 13 can determine whether the job processing function selected by the user can be performed based on the registered user information.

When the CPU 13 determines that the user can use the selected function (YES in step S604), then in step S605, when using the function is permitted, the CPU 13 turns on the power source of the device required by the function to perform the recovery setting according to the power source supply destination for each function processing illustrated in FIG. 4. While the user is setting the job, the recovery processing is performed on the device of the image forming apparatus for the selected job. When the user gives the instruction for performing the job using the operation unit 8, then in step S606, the CPU 13 checks if the job has been input. If the job has been input (YES in step S606), the CUP 13 performs the job processing, and then the processing ends.

With such arrangement, since the engine recovery processing is performed before the user gives the instruction for performing the job, the job can be processed without deteriorating power-saving performance and the responsiveness of the devices.

A third exemplary embodiment will be described below. An exemplary embodiment of the image forming apparatus illustrated in FIGS. 1, 2, and 3 will be described in which, using user's usage history of the image forming apparatus that shifts to the stand-by state from the sleep state, the power source supply destination of the image forming apparatus is controlled. The type of the job most recently selected by the user to be authenticated is managed using the hard disk 14 or a server device (not illustrated). Further, the type of the most recently selected job may be registered to the device for authenticating the user, for example, the IC card, which may be scanned when the user is authenticated, so that the type of the job most recently selected by the user can be specified.

Figure 7:
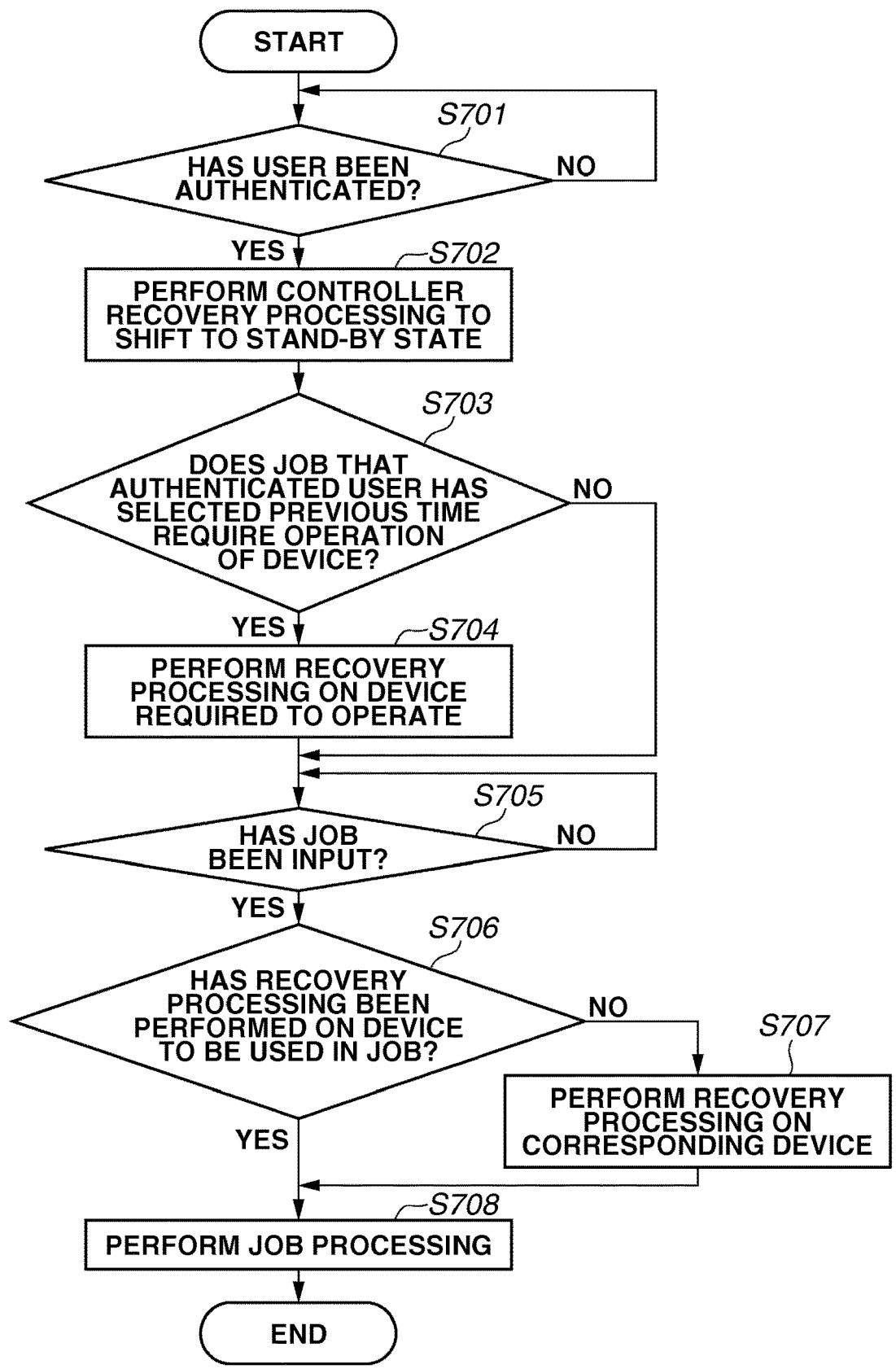
FIG. 7 is a flowchart illustrating a control method for the image forming apparatus.

FIG. 7 is a flowchart illustrating a control method for the image forming apparatus according to the present exemplary embodiment. The example illustrates control in which the power supply to the device to be used in the job is started to cause the device to recover the state where the job processing can be performed at the timing when the usage history of the job selected by the user for the image forming apparatus is confirmed. Each step can be realized by the CPU 13 executing the control program stored in the hard disk 14 or the ROM. Subsequently, control will be described in detail in which the power is supplied to the device specified by the job processing function most recently selected by the authenticated user when the controller 3 shifts to the stand-by state.

In step S701, the user performs an authentication operation, so that the CPU 13 of the controller 3 can recognize which user is operating the image forming apparatus. The user authentication method is arbitrary, and the authentication may be performed at the same time as a sleep recovery operation using the IC card, or may be performed by inputting the user name and a login password after the sleep recovery button is pressed.

In step S702, the CPU 13 controls the switch of the power source device 6 to perform the sleep recovery processing to shift to the stand-by state. In step S703, the CPU 13 specifies the type of the job performed by the currently operating user the previous time based on information about the usage history of the authenticated user, and determines which device's operation of the image forming apparatus the job requires. In step S704, according to the power source supply destination of each function processing illustrated in FIG. 4, the power source of the device required by the function is turned on to perform the recovery setting.

When the user gives the instruction for performing the job using the operation unit 8 (YES in step S705), then in step S706, the CPU 13 determines whether the recovery processing of the device required by the job to be performed has been completed. When the CPU 13 determines that the recovery of each device of the image forming apparatus has been completed (YES in step S706), then in step S708, the CPU 13 performs the job processing received using the operation unit 8, and the processing ends.

On the other hand, when the CPU 13 determines that the recovery processing of the device required by the job to be performed has not been completed (NO in step S706), then in step S707, the recovery processing of each device of the image forming apparatus is continued, and the processing proceeds to step S708.

With such arrangement, since, after the user gives the instruction for performing the job, the engine recovery processing in step S707 is not usually performed, the job can be processed without deteriorating the responsiveness of the image forming apparatus.

According to the above-described exemplary embodiment, in parallel with the controller shifting to the stand-by state, the power supply to the device specified by the job processing function to be performed by the user can be started.

Further, since the power supply to the device other than that required by the user can be limited, the power-saving effect can be also expected and, furthermore, after the controller shifts to the stand-by state, the job processing requested by the user can be swiftly performed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A multifunction apparatus, comprising:
    a display unit; and
    a control unit that includes one or more memories and one or more processors;
    wherein the control unit
    causes the display unit to display a selection screen for selecting a function from among a plurality of functions,
    determines whether or not a user is authorized to use the function selected by the user on the selection screen,
    turns on one or more devices corresponding to the selected function when it is determined that the user is authorized to use the selected function, wherein the one or more devices is not turned on when it is determined that the user is not authorized to use the selected function, and
    performs the selected function in accordance with an instruction for performing the selected function.

2. The multi-function apparatus according to claim 1, further comprising a printer unit, and the control unit turns on one or more of devices of the printer unit corresponding to the print function when it is determined that the user is authorized to use the print function, wherein the one or more devices of the printer unit is not turned on when it is determined that the user is not authorized to use the selected function.

3. The multi-function apparatus according to claim 1, wherein the multi-function apparatus is capable of shifting to at least a first power state and a second power state that is lower in power consumption than the first power state, and wherein the control unit causes the display unit to display the selection screen in accordance with a shift user instruction for causing the multi-function apparatus to shift to the first power state in the second power state.

4. The multi-function apparatus according to claim 3, further comprising:
    a return button for shifting a power state of the multi-function apparatus to the first power state;
    wherein the shift user instruction is an operation of the return button.

5. The multi-function apparatus according to claim 1, wherein the function is a printing function or a reading function.

6. The multi-function apparatus according to claim 1, wherein the selection screen is a menu screen including at two or more of a copying function, a fax function, a scan function, and a storage function.

7. The multi-function apparatus according to claim 3, wherein a part or all of the control unit is turned off when the multi-function apparatus is in the second power state.

8. The multi-function apparatus according to claim 1, wherein, when the function is selected by the user on the selection screen, the display unit displays an authentication screen for an authentication of the user and the control unit determines whether or not a user is authorized to use the function selected by the user on the selection screen based on a user ID input on the authentication screen.

9. A method for controlling a multi-function apparatus, comprising:
    displaying a selection screen for selecting a function from among a plurality of functions; and
    determining whether or not a user is authorized to use the function selected by the user on the selection screen,
    turning on one or more of devices corresponding to the selected function when it is determined that the user is authorized to use the selected function, wherein the one or more devices is not turned on when it is determined that the user is not authorized to use the selected function, and
    performing the selected function in accordance with an instruction for performing the selected function.

10. The multi-function apparatus according to claim 8, wherein the authentication screen is a screen to input the user ID and a password.

11. The multi-function apparatus according to claim 1, wherein the control unit causes the display unit to display the selection screen when it is determined that the user is not authorized to use the selected function.

12. The multi-function apparatus according to claim 1, wherein the one or more devices corresponding to the selected function to be turned on when it is determined that the user is authorized to use the selected function is one or more devices required by the selected function.

13. The multi-function apparatus according to claim 1, wherein the control unit turns on one or more devices corresponding to the selected function before an input of an instruction for performing the selected function from the authorized user.

14. The method according to claim 9, wherein the multi-function apparatus comprising a printer unit, and wherein the turning on is that turning on one or more of devices of the printer unit corresponding to the print function when it is determined that the user is authorized to use the print function, wherein the one or more devices of the printer unit is not turned on when it is determined that the user is not authorized to use the selected function.

15. The method according to claim 9, wherein the multi-function apparatus is capable of shifting to at least a first power state and a second power state that is lower in power consumption than the first power state, and wherein the selection screen is displayed in accordance with a shift user instruction for causing the multi-function apparatus to shift to the first power state in the second power state.

16. The method according to claim 15, the multi-function apparatus comprises a return button for shifting a power state of the multi-function apparatus to the first power state; wherein the shift user instruction is an operation of the return button.

17. The method according to claim 9, wherein the function is a printing function or a reading function.

18. The method according to claim 9, wherein the selection screen is a menu screen including two or more of a copying function, a fax function, a scan function, and a storage function.

19. The method according to claim 9, further comprising: displaying an authentication screen for an authentication of the user when the function is selected by the user on the selection screen.

20. The method according to claim 9, wherein the turning on the one or more devices corresponding to the selected function is performed before an input of an instruction for performing the selected function from the authorized user.

* * * * *